(12) United States Patent
Linton

(10) Patent No.: US 6,848,656 B2
(45) Date of Patent: Feb. 1, 2005

(54) ICE PROTECTION SYSTEM

(75) Inventor: Alan Linton, Northern Ireland (GB)

(73) Assignee: Short Brothers PLC (IE)

( * ) Notice: Subject to any disclaimer, the term of this patent is extended or adjusted under 35 U.S.C. 154(b) by 22 days.

(21) Appl. No.: 10/441,821

(22) Filed: May 20, 2003

(65) Prior Publication Data
US 2004/0031878 A1 Feb. 19, 2004

(30) Foreign Application Priority Data
May 22, 2002 (GB) .............................................. 0211800

(51) Int. Cl.$^7$ ............................................. B64D 15/02
(52) U.S. Cl. ............................... 244/134 C; 244/53 B; 60/39.093
(58) Field of Search .............................. 244/53 B, 134; 60/39.093

(56) References Cited

U.S. PATENT DOCUMENTS

| | | | | |
|---|---|---|---|---|
| 3,566,606 A | * | 3/1971 | Mortlock | 244/134 A |
| 3,933,327 A | * | 1/1976 | Cook et al. | 244/134 R |
| 4,674,714 A | | 6/1987 | Cole et al. | 244/134 |
| 4,738,416 A | * | 4/1988 | Birbragher | 244/134 B |
| 5,088,277 A | * | 2/1992 | Schulze | 244/134 R |
| 5,257,498 A | | 11/1993 | Nikkamen et al. | |
| 6,131,855 A | | 10/2000 | Porte | 244/134 B |
| 6,241,189 B1 | | 6/2001 | Porte | 244/134 B |
| 6,427,434 B2 | * | 8/2002 | Porte et al. | 244/134 B |
| 6,592,078 B2 | * | 7/2003 | Porte et al. | 244/134 B |
| 2001/0003897 A1 | | 6/2001 | Porte et al. | 60/39.093 |
| 2002/0047070 A1 | | 4/2002 | Breer et al. | 244/134 |

FOREIGN PATENT DOCUMENTS

| | | | |
|---|---|---|---|
| EP | 1111226 A1 | 6/2001 | |
| GB | 2259679 A | 3/1993 | |
| GB | 2 259 679 A | 3/1993 | ........... B64D/15/04 |

OTHER PUBLICATIONS

Search Report issued Nov. 21, 2003 for corresponding UK application no. GB0311635.7.
Search Report issued Dec. 2, 2003 for corresponding French application no. FR 0306051.

* cited by examiner

Primary Examiner—Galen Barefoot
(74) Attorney, Agent, or Firm—Myers Bigel Sibley & Sajovec

(57) ABSTRACT

An aircraft engine nacelle nose cowl has a supply duct to deliver pressurised hot gas into an internal compartment of the nose cowl. A slot is provided in the nose cowl to enable pressurised hot gas to pass out of the compartment through the slot. As the pressurised hot gas passes out of the compartment through the slot, this causes a film of water on an outer surface of the nose cowl to detach from the nose cowl. The slot is of restricted dimensions which causes localised heating of the nose cowl around the slot as the pressurised hot gas pass out of the compartment through the slot. In this manner ice is prevented from accumulating on the outer surface of the nose cowl and/or ice is removed from the outer surface of the nose cowl.

40 Claims, 3 Drawing Sheets

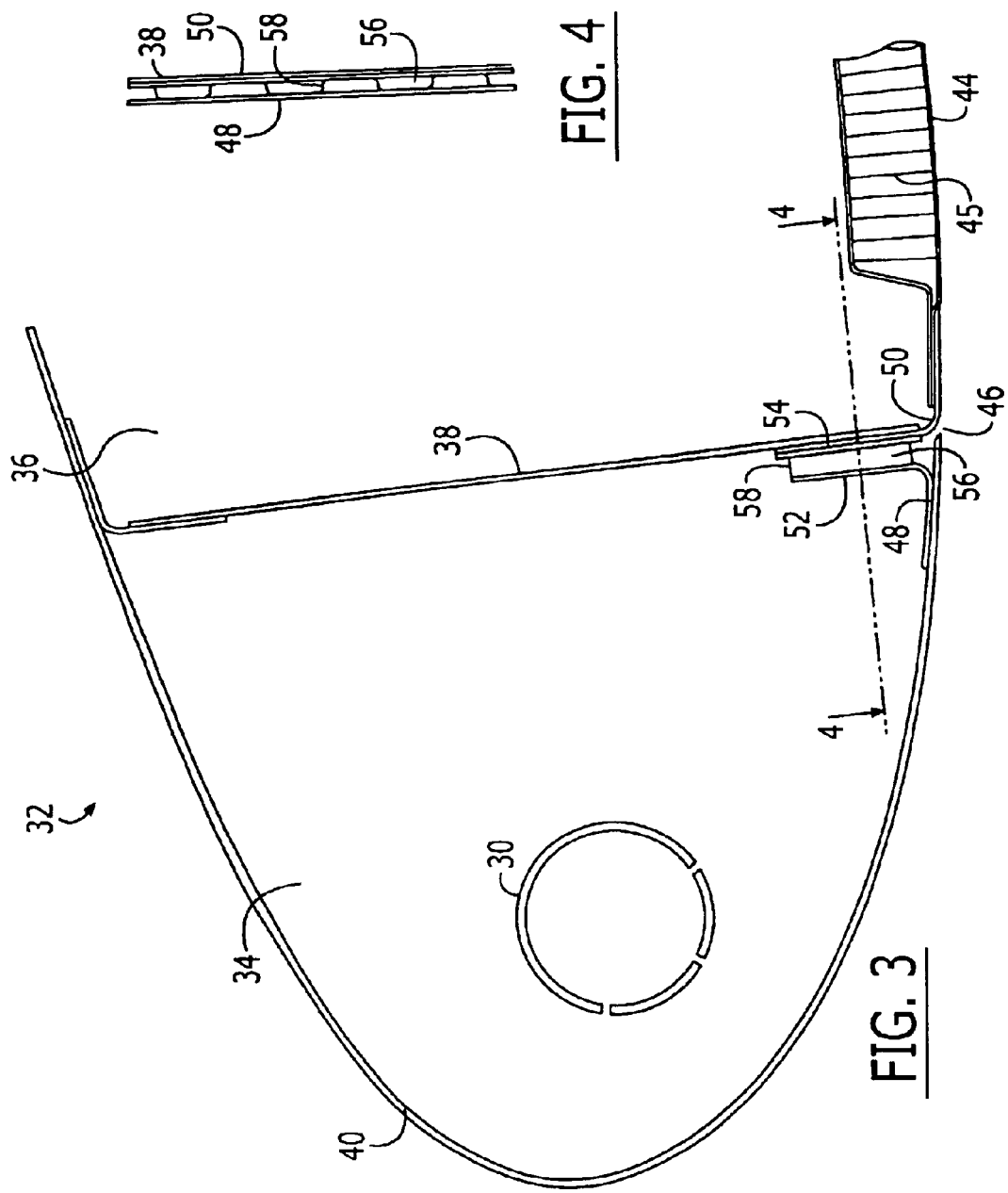

ICE PROTECTION SYSTEM

RELATED APPLICATION

This application claims priority to Great Britain Patent Application No. GB0211800.8, filed May 22, 2002, the disclosure of which is hereby incorporated herein by reference.

FIELD OF THE INVENTION

This invention relates to an ice protection system suitable for use with aircraft structures. In particular, this invention is concerned with, but not exclusively limited to, an ice protection system for use with an aircraft engine nacelle nose cowl.

BACKGROUND TO THE INVENTION

Some aircraft surfaces require to be protected from the accumulation of ice caused by the collection and freezing of ambient moisture. Ice protection is frequently achieved by heating the aircraft skin so that the water catch on the skin is prevented from freezing and is partially or completely evaporated. If the water is not completely evaporated it will run back along the aircraft skin surface and may then freeze and accumulate on a part of the surface that is not heated. There is a danger that the ice so formed will adversely affect the aircraft's efficiency and handling qualities. In addition, any accumulated ice on the aircraft surface may become detached and impact upon another part of the aircraft thereby causing damage. It is particularly desirable to prevent the entry of large pieces of ice into the engine intake, and consequently engine intake ice protection systems usually provide for a complete removal of the water catch by providing sufficient heat to ensure full evaporation of the water.

In UK patent application number GB 2259679 an ice protection system is disclosed for preventing the accumulation of ice on the leading edge of an aircraft engine nacelle nose cowl. The nose cowl comprises a forward compartment formed by a forward bulkhead and a skin structure extending forwardly of the forward bulkhead to form the leading-edge profile. The outer surface of this leading-edge profile is required to be protected from the accumulation of ice thereon. The nose cowl includes a rear compartment between the forward bulkhead and a rear bulkhead, supply duct means extending through the rear compartment and into the forward compartment for the delivery thereto of pressurised hot gases for distribution over the inner surface of the skin structure to prevent accumulation of ice on or to remove ice from the outer surface of this skin structure.

Although the ice protection system described in GB 2259679 has been found to be successful, sufficient heat has to be provided by the pressurised hot gases distributed over the inner surface of the skin structure to produce full evaporation of the film of water passing over the outer surface of the skin structure. The heat required to produce this evaporation is a drain on the fuel consumption of the aircraft, and makes it necessary to use materials such as titanium and stainless steel thereby increasing the weight and cost of the aircraft.

There is therefore a need for an ice protection system which will overcome at least some of the disadvantages associated with the known systems.

SUMMARY OF INVENTION

According to the invention there is provided a system for use with a structure to protect the structure from accumulation of ice on at least part of an outer surface of the structure, the system comprising:

means to deliver pressurised gas into an internal compartment of the structure; and at least one aperture in the structure to facilitate passage of gas out of the compartment;

the aperture being configured for passage of gas out through the aperture at a momentum sufficient to detach a film of water from an outer surface of the structure.

By detaching a film of water from the outer surface of the structure, this ensures that ice does not accumulate on at least part of the outer surface of the structure, and/or that that ice is removed from at least part of the outer surface of the structure. The ice protection system according to the invention may thus be employed to prevent the accumulation of ice on or to remove ice from the outer surface of an aircraft structure without requiring sufficient heat to produce full evaporation of the water passing over the outer surface.

The air flow through the slot enhances the performance of the anti-icing system by removing water from the surface of the aircraft structure efficiently using the momentum of the air flow rather than its thermal energy. Considerably less energy is required to remove water by entraining it in the exhaust air flow in this manner than it does to evaporate the water as proposed in conventional anti-icing systems.

In one embodiment of the invention the aperture is of reduced dimensions to cause localised heating of the structure around the aperture upon passage of gas out through the aperture.

According to another aspect of the invention there is provided a system for use with a structure to protect the structure from accumulation of ice on at least part of an outer surface of the structure, the system comprising:

means to deliver pressurised gas into an internal compartment of the structure; and at least one aperture in the structure to facilitate passage of gas out of the compartment;

the aperture being of restricted dimensions to cause localised heating of the structure around the aperture upon passage of gas out through the aperture.

By locally heating the structure around the aperture, this ensures that ice does not accumulate on at least part of the outer surface of the structure, and/or that that ice is removed from at least part of the outer surface of the structure. The ice protection system according to the invention may thus be employed to prevent the accumulation of ice on or to remove ice from a localised region of the outer surface of an aircraft structure without requiring sufficient heat to produce full evaporation of the water passing over the localised region.

In addition, the hot air flow converging towards the blow-off slot heats the aircraft structure around the slot and thereby prevents ice forming in that region. In an embodiment of the invention in which the blow-off slot is particularly short, this local heating effect is of particular importance.

The structure may be an aircraft structure. In one case the aircraft structure comprises an aircraft engine nacelle nose cowl.

It has been found that by using the ice protection system according to the invention, substantially all water is removed from the aircraft engine nacelle surface. There is typically no further water impingement on the nacelle inner surface downstream of the location where the slot is located. There is therefore no further ice formation downstream of the blow-off slot. Preferably the aperture is located upstream of the aircraft engine air intake.

Ideally the aperture is located on an inward side of the aircraft engine nacelle nose cowl. The nacelle anti-icing system may be located on the inner surface of the nacelle to prevent ice ingestion into the engine.

The aperture may be located at a junction region of the aircraft structure.

In one embodiment of the invention the compartment is a forward compartment formed by a forward bulkhead and an inner surface of the structure extending forwardly of the forward bulkhead. Preferably the forward bulkhead is attached to the structure by means of a passage member.

In a preferred embodiment the system comprises means to direct gas towards the aperture. Ideally the directing means is arranged to direct gas out through the aperture at an angle in the range of from 45° to 90° to the direction of airflow over the outer surface of the structure. Most preferably the directing means is arranged to direct gas out through the aperture substantially normal to the direction of airflow over the outer surface of the structure.

The blow-off slot is configured at a defined angle to the aircraft engine nacelle surface to ensure that the perpendicular component of momentum of the air stream will remove the film of runback water.

The directing means may comprise a passage to channel gas towards the aperture. Preferably the passage is formed by two or more opposed passage members. A forward one of the passage members may be attached to an inner surface of the structure. A rearward one of the passage members may be attached to an outer surface of the structure. Ideally the transverse dimension of the passage is substantially equal to the transverse dimension of the aperture. Most preferably the system comprises means to diffuse gas as it passes through the passage. The diffusing means may comprise one or more baffles in the passage.

In one case the aperture is in the form of a slot. The slot may extend in a circumferential direction around at least part of the structure. Ideally the slot extends around the entire circumference of the structure.

Preferably the slot extends substantially transverse to the direction of airflow over the outer surface of the structure. In one embodiment the slot is of sawtooth form. The system may comprise a plurality of slots. Ideally the slots are located in a row. In another case the system may comprise a plurality of slot rows. Preferably the slot rows are staggered.

In another embodiment of the invention the gas temperature is in the range of from 80° C. to 200° C. Ideally the gas temperature is approximately 140° C.

Depending on the gas mass flow rate it may be possible to prevent ice formation on the intake lip over the usual range of icing conditions with a gas temperature of around 80° C. An air temperature of 140° C. is considered likely to provide fully effective ice protection throughout the operational envelope, and would correspond to a structure temperature of 110° C. which is acceptable for both aluminium alloys, allowing for annealing, and for conventional adhesives. The air temperature is typically 30° C. higher than the greatest co-existing structure temperature in icing conditions.

The structure may be at least partially of an aluminium alloy material.

The structure may be at least partially manufactured of adhesive-bonded materials. A further benefit of the ice protection system according to the invention is that the enhanced efficiency of the system enables the anti-icing system to operate using relatively low thermal energy. This makes it possible to use alternative materials for the aircraft structure, for example adhesive-bonded structures.

In one case the means to deliver gas into the compartment comprises a supply duct. Preferably the means to deliver gas into the compartment comprises an apertured spray ring in communication with the supply duct.

The system may comprise electrical heating means.

The invention also provides an aircraft structure comprising an ice protection system of the invention.

The invention also provides in a further aspect a method of protecting a structure from accumulation of ice on at least part of an outer surface of the structure, the method comprising the steps of:

delivering pressurised gas into an internal compartment of the structure; and passing the gas out of the compartment at a momentum sufficient to detach a film of water from an outer surface of the structure.

In one embodiment of the invention the gas is passed out of the compartment through at least one aperture in the structure. The aperture may be of reduced dimensions to cause localised heating of the structure around the aperture upon passage of the gas out through the aperture.

According to a further aspect of the invention, there is provided a method of protecting a structure from accumulation of ice on at least part of an outer surface of the structure, the method comprising the steps of:

delivering pressurised gas into an internal compartment of the structure; and passing the gas out of the compartment through at least one aperture of reduced dimensions in the structure the aperture to cause localised heating of the structure around the aperture.

Preferably the method comprises the step of directing the gas towards the aperture. Ideally the method comprises the step of directing the gas out through the aperture substantially normal to the direction of airflow over the outer surface of the structure. Most preferably the method comprises the step of diffusing the gas upon passage out of the compartment through the aperture.

In one case, the gas is delivered into the compartment at a temperature in the range of from 80° C. to 200° C. Ideally the gas is delivered into the compartment at a temperature of approximately 140° C.

The invention provides in one case a method of protecting an aircraft structure from accumulation of ice on at least part of an outer surface of the aircraft structure.

The heat loads in a conventional ice protection system include:

1. convection;

2. "sensible heat"—raising the temperature of the water collected enough to achieve the required evaporation rate; and 3. latent heat required to evaporate all the water collected.

The heat loads in the ice protection system according to the invention include:

1. convection, but with reduced temperature difference skin to ambient;

2. sensible heat—raising the temperature of the water collected enough to prevent freezing; and 3. latent heat corresponding to the relatively low evaporation rate that arises due to the temperature of the water film.

With the ice protection system according to the invention, the convection heat load is reduced, the sensible heat load is typically halved or better and the latent heat load is greatly reduced. The total heat load is therefore expected to be less than half that of a conventional ice protection system. Bearing in mind that only about 60% of the thermal energy of the hot air stream is transferred to the water catch in a conventional hot air ice protection system, the required air temperature increment above freezing point for the ice protection system according to the invention is expected to be roughly half that of a conventional ice protection system given the same mass flow rate of air.

To retrofit the ice protection system according to the invention to replace a conventional ice protection system, hot air at the same mass flow rate but lower temperature could be used, or alternatively a lower mass flow rate at the same temperature could be used. The latter option is more desirable because the same source of hot air, such as an engine compressor bleed port, could be used and the throat area of a flow-limiting venturi could be easily decreased to provide the lower mass flow rate.

In certain cases it may be desirable for aircraft ice protection systems to be capable of operating in extreme icing conditions including Freezing Rain and Supercooled Large Droplet (SLD) conditions. The ice protection system according to the invention has the potential to enhance the efficiency of aircraft ice protection systems to meet Freezing Rain and SLD ice protection requirements.

BRIEF DESCRIPTION OF THE DRAWINGS

The invention will be more clearly understood from the following description of an embodiment thereof, given by way of example only, with reference to the accompanying drawings, in which:

FIG. 3 is a cross-sectional side elevation of an upper forward part of a turbofan aircraft engine showing in outline a nacelle nose cowl according to the invention; and FIG. 4 is a view along line IV—IV in FIG. 3.

DESCRIPTION OF THE PREFERRED EMBODIMENTS

Figure 1:
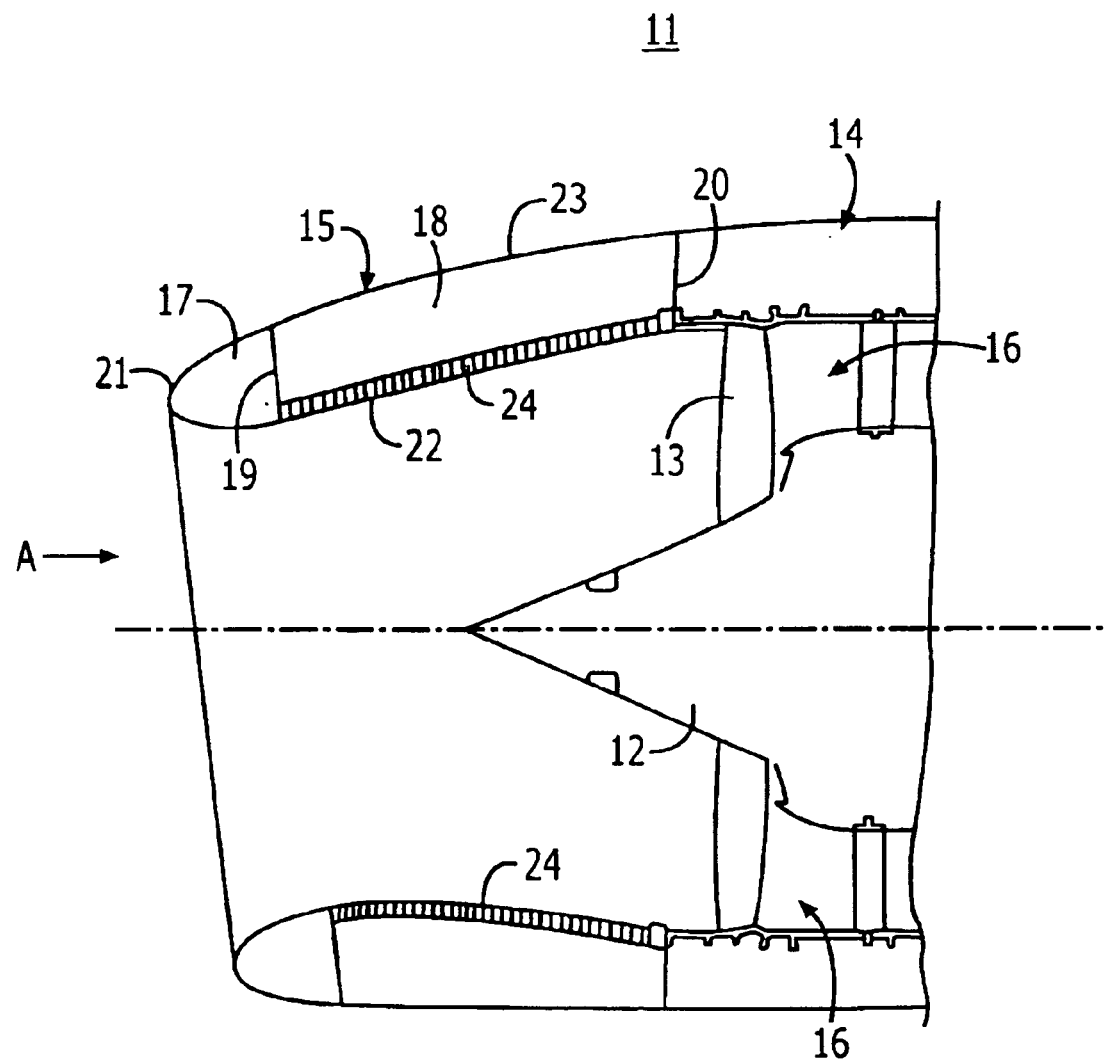
FIG. 1 is a cross-sectional side elevation of a forward part of a turbofan aircraft engine, showing in outline the nacelle nose cowl.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. Although described herein primarily with respect to protecting aircraft structures from the accumulation of ice thereon, it will be understood that ice protection system and method embodiments of the present invention may also be used with other structures without departing from the principles of the present invention.

Referring to the drawings and initially to FIG. 1 thereof, a forward part of an aircraft engine 11 is shown comprising a turbo powerplant 12 carrying rotary fan blades 13 enclosed by an engine nacelle 14. The nacelle 14 has an inlet nose cowl 15 which directs intake air A to a fan duct 16.

The nose cowl 15 is subdivided into a leading edge forward compartment 17 and a rear compartment 18. The forward compartment 17 is bounded by a forward bulkhead 19 and a skin structure 21 which forms the leading edge profile of the nose cowl 15. The rear compartment 18 is bounded by the forward bulkhead 19 and a rear bulkhead 20, and inner and outer skin structures 22, 23. The inner skin structure 22 of the compartment 18 is required to have good sound absorbing properties and for this purpose noise attenuation panels 24 are typically provided. The panels 24 extend for as much of the full circumference of the nose cowl 15 that is reasonably practicable.

Figure 2:
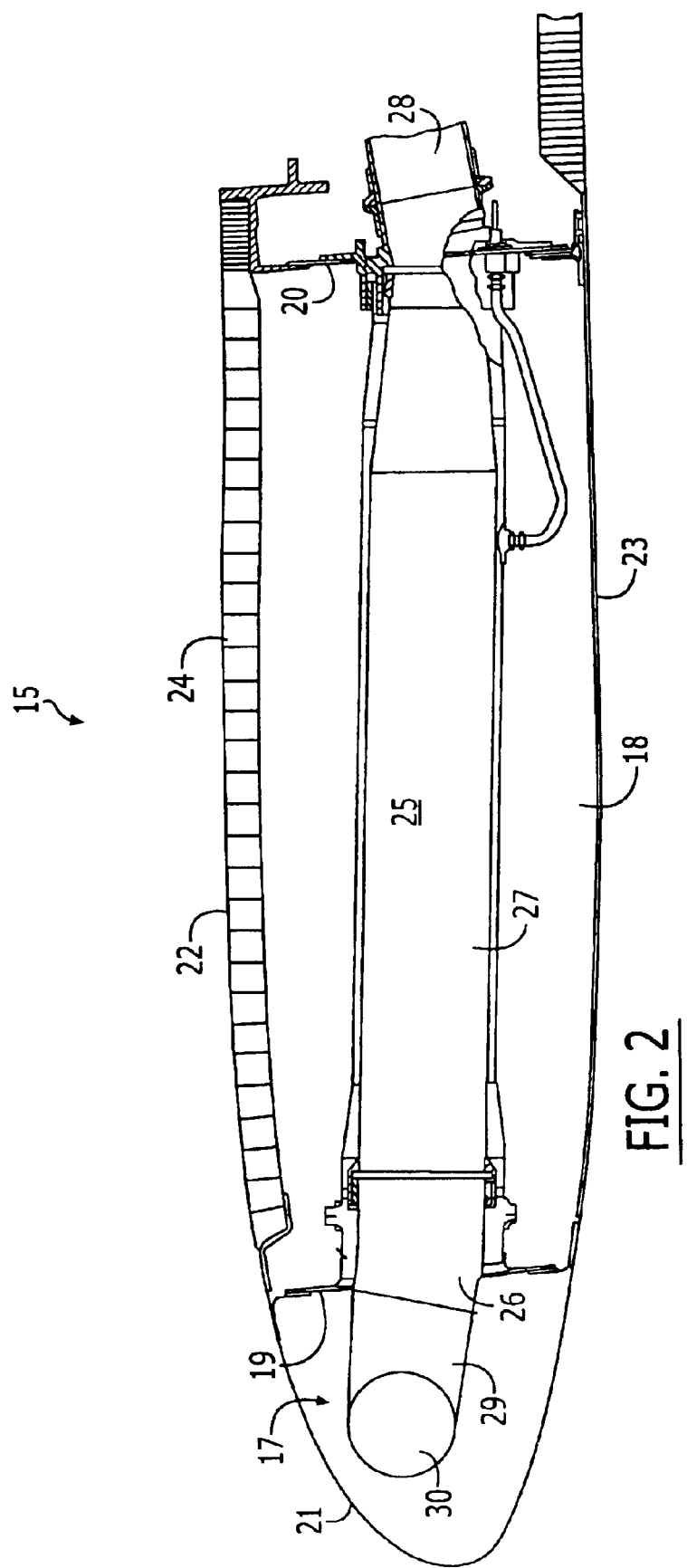
FIG. 2 is a cross-sectional side elevation of a lower part of the nose cowl of FIG. 1, illustrating a forward region of the nose cowl.

Referring now to FIG. 2, the forward bulkhead 19 is built up from arcuate sections to form with the skin structure 21 a gas tight forward compartment 17 which is supplied with pressurised hot gases through a supply duct 25. These hot gases are subsequently discharged from the compartment 17 through a discharge duct.

The supply duct 25 is formed by a forward supply duct portion 26 which passes through the bulkhead 19, a main supply duct portion 27 which extends throughout the length of the rear compartment 18, and a rear supply duct portion 28 which extends through the rear bulkhead 20. The forward portion 26 of the supply duct 25 extends forwardly into the forward compartment 17 and is connected to an inlet duct 29 of a tubular spray ring 30 which is apertured, and which extends circumferentualy within the compartment 17. Spray rings of this type are apertured so that when supplied with pressurised hot gases delivered to the spray rings they distribute the hot gases over the inner surface of the skin structure 21 to prevent the accumulation of ice on or to remove ice from the outer surface of the skin structure 21.

The heat provided by the hot gases is transferred by convection and conduction through the skin structure 21 to the ice or film of water on the outer surface of the skin structure 21. In order to prevent ice forming on the skin structure 21 it is necessary using this type of ice protection system to provide sufficient heat to produce full evaporation of the water film on the skin structure 21.

It will be appreciated that other anti-icing systems that have alternative means of distributing hot air, such as swirl systems, double skin passages and hybrid systems may be used in addition to or in place of the apertured spray ring 30.

Referring now to FIGS. 3 and 4, there is illustrated an upper forward part of a nacelle nose cowl 32 according to the invention. The nose cowl 32 is divided into a forward compartment 34 and a rear compartment 36 by a bulkhead 38. Pressurised hot gases are supplied to the forward compartment 34 by any suitable means, such as for example, the supply duct 25 and spray ring 30 described above with reference to FIGS. 1 and 2.

The forward compartment 34 is bounded by the bulkhead 38 and a forward skin structure 40 which forms the leading edge profile of the nose cowl 32. The rear compartment 36 is formed partly by the bulkhead 38 and a rear skin structure 44. The skin structure 44 is provided with a noise attenuation panel 45.

The panel 41 includes a perforated acoustic liner which uses bonded aluminium alloy materials attached to the engine intake forward skin structure 40. The forward and rear skin structures 40, 44 are made of bonded aluminium alloy materials, and all the other components of the nose cowl 32 are made of aluminium alloys.

A transversely extending slot 46 is located in the lower part of the forward compartment 34 adjacent to and forward of the bulkhead 38. A forward angle member 48 attaches the forward skin structure 40 to the bulkhead 38, and a rear angle member 50 attaches the rear skin structure 44 to the bulkhead 38. Opposed plates 52, 54 of the angle members define a restricted passage 56 of substantially the same cross-section as the slot 46, as illustrated in FIG. 4.

A baffle 58 is mounted between the opposed plates 52, 54 in order to provide a structural load path across the slot 46 to improve heat transfer from the hot gases to the adjacent structure and to diffuse hot gases passing through the slot 46.

In use, water collects on the heated forward skin structure 40, and forms a surface film that runs in the direction of the ambient airstream passing over the slot 46 which extends transversely to the direction of the ambient airstream. The pressurised hot gases are delivered to the forward compartment 34, are distributed over the inner surface of the forward skin structure 40, and are then discharged through the restricted passage 56 and out of the forward compartment 34 through the slot 46. The stream of discharged hot gases passing out through the slot 46 detaches the water film from the forward skin structure 40, and then surface tension causes the water film to break up into smaller drops that are carried away by the ambient airstream.

The convergence of the hot gases in the passage 56 as they approach the slot 46 enhances local heat transfer to the surrounding skin structure thereby further increasing the efficiency of the ice protection system. The positioning of the slot 46 and the angle members 48, 50 adjacent to the bulkhead 38 further enhance the heat transfer to the skin structure.

The nose cowl 32 provides a means of preventing the formation of ice thereon without having to produce sufficient heat to provide full evaporation of the water film on the outer surface of the cowl.

The ice protection system according to the invention thus provides a simple means of enhancing hot gas ice protection systems with effective water removal by making use of the exhaust gas flow.

The heated forward skin structure 40 need only maintain the temperature of the water film above freezing point in order for the hot gases issuing from the slot 46 to remove any residual water and prevent water runback on to an unheated surface. In particular, it is not required to provide full evaporation of the water film. The nose cowl 32 according to the invention greatly reduces the amount of heat required for operation of the ice protection system. This is because providing the latent heat of evaporation generally constitutes most of the heat load in the previously known ice protection systems.

Using the ice protection system according to the invention, less heat is required for ice protection and removal of surface water, thereby improving the fuel consumption of the aircraft. A smaller quantity of hot gas is required to provide effective ice protection thereby reducing the bleed consumption of the engine and improving engine efficiency.

The diffused low thermal energy gases exhausted from the ice protection system according to the invention contrasts with the potentially damaging hot outlet jet from conventional ice protection systems.

The thermal efficiency achieved by using the slot 46 in the ice protection system according to the invention enables the ice protection system to operate at relatively low gas temperatures or at relatively low gas mass flow rates. These are alternative means of obtaining the reduction in heat transfer achieved by the invention, and both alternatives will realise improved thermal efficiency.

The use of low temperature gas means that high temperature materials are not required. This is because a high heat transfer rate required for full evaporation of the water film is not needed with the ice protection system according to the invention. The nose cowl 32 can thus use aluminium alloys or materials instead of stainless steel or titanium thereby reducing weight and cost. The ice protection system according to the invention also enables the use of adhesive bonded assemblies instead of the previously required welded, brazed or riveted assemblies.

The ice protection system according to the invention operates with relatively low thermal energy gas, thereby permitting use of lighter and cheaper materials and adhesive-bonded or otherwise temperature-limited structures without overheating. In addition potential hazards to burst air ducts are also reduced.

The potential to use low gas mass flow means that the ice protection system according to the invention may be retrofitted to replace an existing conventional ice protection system using the existing hot air source but with a more restrictive flow control system.

The slot 46 is preferably designed to avoid adverse effects on the aircraft's aerodynamics due to boundary layer separation. It may be desirable to make the slot 46 discontinuous so that the outlets will act as vortex generators which tend to energise the boundary layer and increase its turbulence level ensuring that it remains attached. Other ways of adjusting the interaction with the boundary layer include using the baffle 58 to diffuse the gas flow through the passage 56, using a sawtooth slot rather than the straight slot, or using a slot located at an inclined angle to the surface flow direction.

It will be appreciated that other forms of slot may be used instead of the straight slot 46. In particular, variants of the slot 46 within the scope of the invention include continuous slots, discontinuous slots or holes in single or multiple staggered rows; a short slot or a hole or a group of short slots or holes for providing point ice protection at a localised region, dual slots on the upper and lower surfaces of a wing or horizontal stabiliser ice protection system with a separate or common air supply; sawtooth slots or sawtooth rows of short slots or holes, swept slots or swept rows of short slots or holes or swept rows of short sawtooth slots, or slots or holes with a sideways component of velocity.

It will be appreciated that the ice protection system according to the invention may alternatively or additionally be incorporated into a wing or a horizontal stabiliser in a similar manner to the nose cowl 32 described above with reference to FIGS. 3 and 4.

The ice protection system according to the invention can also be combined with an electrically heated ice protection system to provide the required ice prevention or removal. In this case the air delivered into the forward compartment 34 of the nose cowl 32 may be of a relatively low temperature. It has been found that electrically heated ice protection systems by themselves are usually incapable of providing complete water removal throughout the aircraft operating envelope, but their combination with the ice protection system according to the invention makes ice prevention feasible.

The ice protection system according to the invention enhances the capability of electrically heated ice protection systems to provide effective water removal throughout the operational envelope.

The invention can also be used to provide ice protection at a point or region of reduced dimensions by providing a flow of hot gases through a short slot or hole of restricted dimensions. In this embodiment of the invention, the slot or hole provides an exhaust for a small amount of hot gases from an internal reservoir of hot gases which causes the internal gas flow in the aircraft to converge towards the hole or short slot. This ensures a higher level of heat transfer at the skin structure which would not be assured if the bulk of the internal flow was stagnant or moving slowly, or if it was principally directed towards a different part of the skin structure. This local heating of the skin structure will supplement the blow-off effect to prevent ice formation around the hole or short slot. This variant of the invention is considered to be useful for ice protection on the point of a radome or spinner. This variant of the invention may also be useful at a junction area such as a region where the wing leading edge meets with the side of the fuselage. The external airflow in this region is such that a snowball-like lump of ice tends to form which could break off and impact on the tail surfaces of the aircraft or on tail-mounted engines. Drain masts and pitot static probes tend to have similar problems, and could also benefit from this invention.

The invention provides a simple system for localised or point ice protection.

The invention is not limited to the embodiments hereinbefore described, with reference to the accompanying FIGS. 3 and 4, which may be varied in construction and detail.

What is claimed is:

1. A system for use with a structure comprising an aircraft engine nacelle nose cowl to protect the structure from accumulation of ice on at least part of an outer surface of the structure, the system comprising:

means to deliver pressurised gas into an internal compartment of the structure; and at least one aperture in the structure to facilitate passage of gas out of the compartment;

the at least one aperture being located so as to extend in a circumferential direction around an inward side of the nose cowl and configured for passage of gas out through the aperture at an angle in the range of from about 45° to 90° to the direction of airflow over the outer surface of the structure and at a momentum sufficient to detach a film of water from an outer surface of the structure.

2. A system as claimed in claim 1 wherein the aperture is of restricted dimensions to cause localised heating of the structure around the aperture upon passage of gas out through the aperture.

3. A system for use with a structure comprising an aircraft engine nacelle nose cowl to protect the structure from accumulation of ice on at least part of an outer surface of the structure, the system comprising:

means to deliver pressurised gas into an internal compartment of the structure; and at least one aperture in the structure to facilitate passage of gas out of the compartment, at an angle in the range of from about 45° to 90° to the direction of airflow over the outer surface of the structure and;

the at least one aperture being located so as to extend in a circumferential direction around an inward side of the nose cowl and of restricted dimensions to cause localised heating of the structure around the aperture upon passage of gas out through the aperture.

4. A system as claimed in claim 3 wherein the aperture is located upstream of the aircraft engine air intake.

5. A system as claimed in claim 3 wherein the compartment is a forward compartment formed by a forward bulkhead and an inner surface of the structure extending forwardly of the forward bulkhead.

6. A system as claimed in claim 5 wherein the forward bulkhead is attached to the structure by means of a passage member.

7. A system as claimed in claim 3 wherein the system comprises means to direct the gas towards the aperture.

8. A system as claimed in claim 7 wherein the directing means is arranged to direct gas out through the aperture at an angle in the range of from about 45° to about 90° to the direction of airflow over the outer surface of the structure.

9. A system as claimed in claim 8 wherein the directing means is arranged to direct gas out through the aperture substantially normal to the direction of airflow over the outer surface of the structure.

10. A system as claimed in claim 7 wherein the directing means comprises a passage to channel the gas towards the aperture.

11. A system as claimed in claim 10 wherein the passage is formed by two or more opposed passage members.

12. A system as claimed in claim 11 wherein a forward one of the passage members is attached to an inner surface of the structure.

13. A system as claimed in claim 12 wherein a rearward one of the passage members is attached to an outer surface of the structure.

14. A system as claimed in claim 10 wherein the transverse dimension of the passage is substantially equal to the transverse dimension of the aperture.

15. A system as claimed in claim 10 wherein the system comprises means to diffuse the gas as it passes through the passage.

16. A system as claimed in claim 15 wherein the diffusing means comprises one or more baffles in the passage.

17. A system as claimed in claim 3 wherein the aperture is in the form of a slot.

18. A system as claimed in claim 17 wherein the slot extends in a circumferential direction around at least part of the structure.

19. A system as claimed in claim 18 wherein the slot extends around the entire circumference of the structure.

20. A system as claimed in claim 17 wherein the slot extends substantially transverse to the direction of airflow over the outer surface of the structure.

21. A system as claimed in claim 17 wherein the slot is of sawtooth form.

22. A system as claimed in claim 17 wherein the slot comprises a plurality of slots.

23. A system as claimed in claim 22 wherein the slots are located in a row.

24. A system as claimed in claim 23 wherein the plurality of slots comprises a plurality of slot rows.

25. A system as claimed in claim 24 wherein the slot rows are staggered.

26. A system as claimed in claim 3 wherein the gas temperature is in the range of from about 80° C. to about 200° C.

27. A system as claimed in claim 26 wherein the gas temperature is approximately 140° C.

28. A system as claimed in claim 3 wherein the structure at least partially comprises an aluminium alloy material.

29. A system as claimed in claim 3 wherein the structure at least partially comprises adhesive-bonded materials.

30. A system as claimed in claim 3 wherein the means to deliver gas into the compartment comprises a supply duct.

31. A system as claimed in claim 30 wherein the means to deliver gas into the compartment comprises an apertured spray ring in communication with the supply duct.

32. A system as claimed in claim 3 wherein the system further comprises electrical heating means configured to heat the structure.

33. A method of protecting a structure comprising an aircraft engine nacelle nose cowl from accumulation of ice on at least part of an outer surface of the structure, the method comprising the steps of:

delivering pressurised gas into an internal compartment of the structure; and passing the gas out of the compartment at an angle in the range of from about 45° to 90° to the direction of airflow over the outer surface of the structure and at a momentum sufficient to detach a film of water from an outer surface of the structure wherein said at least one aperture is located so as to extend in a circumferential direction around an inward side of the nose cowl.

34. A method as claimed in claim 33 wherein the aperture is of restricted dimensions to cause localised heating of the structure around the aperture upon passage of the gas out through the aperture.

35. A method of protecting a structure comprising an aircraft engine nacelle nose cowl from accumulation of ice on at least part of an outer surface of the structure, the method comprising the steps of:

delivering pressurised gas into an internal compartment of the structure; and passing the gas out of the compartment at an angle in the range of from about 45° to 90° to the direction of airflow over the outer surface of the structure and through at least one aperture located so as to extend in a circumferential direction around an inward side of the nose cowl and of restricted dimensions in the structure the aperture to cause localised heating of the structure around the aperture.

36. A method as claimed in claim 35 further comprising the step of directing the gas towards the aperture.

37. A method as claimed in claim 36 further comprising the step of directing the gas out through the aperture substantially normal to the direction of airflow over the outer surface of the structure.

38. A method as claimed in claim 36 further comprising the step of diffusing the gas upon passage out of the compartment through the aperture.

39. A method as claimed in claim 35 wherein the gas is delivered into the compartment at a temperature in the range of from about 80° C. to about 200° C.

40. A method as claimed in claim 39 wherein the gas is delivered into the compartment at a temperature of approximately 140° C.

\* \* \* \* \*